July 9, 1929.  M. NAGGY ET AL  1,720,428
TOOL FOR REMOVING HUB BUSHINGS AND THE LIKE
Filed July 21, 1927
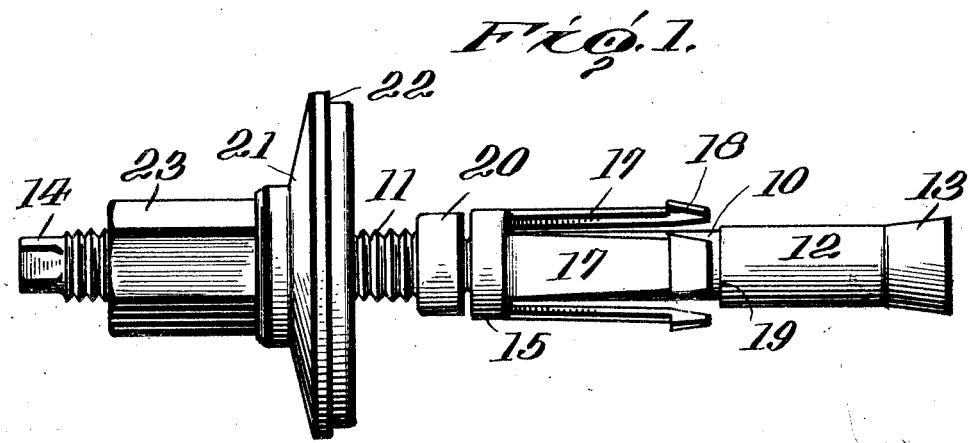
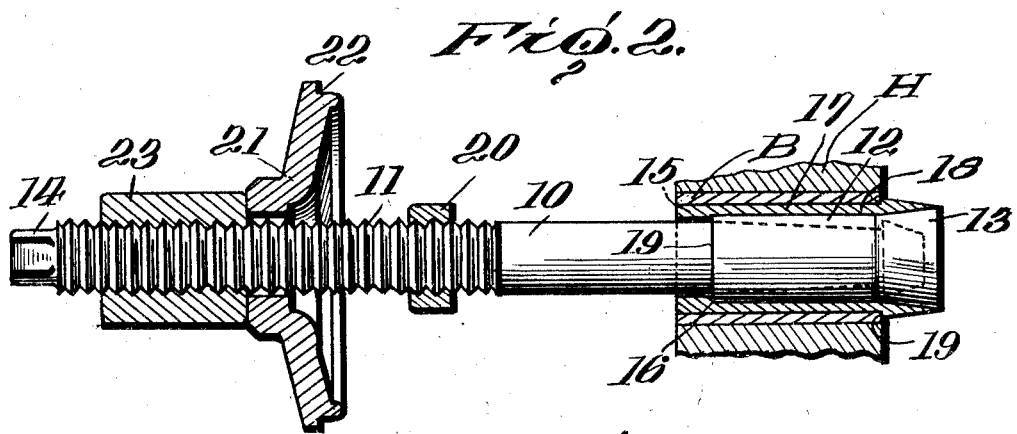
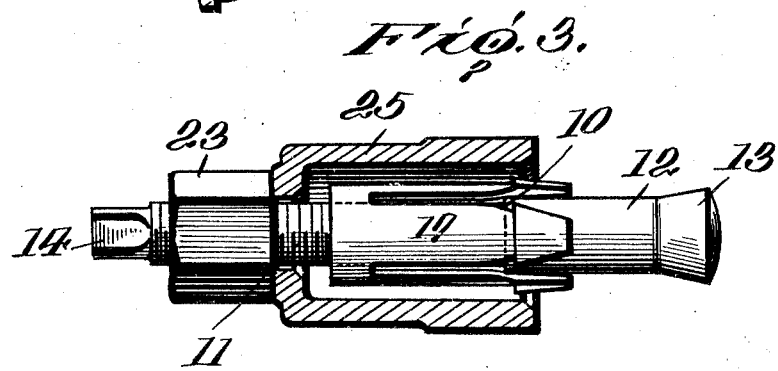
Inventor
Mitchell Naggy
Stanley Sikorski
By
Wm. D. Hodges  Attorney

Patented July 9, 1929.

1,720,428

UNITED STATES PATENT OFFICE.

MITCHELL NAGGY AND STANLEY SIKORSKI, OF PORT RICHMOND, VIRGINIA.

TOOL FOR REMOVING HUB BUSHINGS AND THE LIKE.

Application filed July 21, 1927. Serial No. 207,520.

This invention is a device for removing the hub bushings of automobiles, but is not limited to such use.

In repairing automobiles, it is frequently very difficult to remove the hub bushings for replacement or other purposes, due largely to the fact that these bushings are inserted into the bearings with a drive fit, and the available working space for the operation of a bushing withdrawing tool is limited. One of the objects of the invention is to provide a bushing withdrawing tool of simple construction, having a bushing-engaging member capable of being passed through the bushing to be removed, and subsequently expanded to engage the inner or rear end of said bushing. A further object is to provide contractible bushing engaging members of simple construction, and maintaining them in normally expanded positions. A further object is to provide effective means for applying a pulling tension to the tool so as to readily remove the bushing from the hub in which it is carried.

The invention will be hereinafter fully set forth and particularly pointed out in the claims.

In the accompanying drawing:—

Figures 1 and 2 are side elevations taken at right angles to each other, illustrating a tool constructed in accordance with the invention. Figure 3 is a longitudinal sectional view illustrating a slight modification.

Referring to the drawing, 10 designates a shank provided with a threaded portion 11, and a head 12 at one end. The said head is provided with a tapered enlargement 13, and the other end of the shank is provided with an angular portion 14 shaped to be engaged by a wrench. Slidably mounted on the shank 10 is a bushing engaging member 15, having longitudinally extended resilient fingers 17, each provided with a bushing engaging shoulder 18. Said fingers 17 are provided with inner tapered surfaces complemental to the tapered surface of the enlargement 13. The member 15 is provided with an opening through which the shank 10 extends, a slidable movement of said member in one direction is limited by a shoulder 19 formed by the head 12, and in the other direction by a nut 20 adjustable upon the threaded portion 11 of the shank.

The shank 10 is extended through an opening formed in an abutment member 21, which is provided with an annular shoulder 22 shaped to engage the hub in which the bushing is located. A nut 23 engages the threaded portion 11 of the shank and bears against the abutment member 21, as shown.

In practice, when a bushing is to be removed, the bushing engaging member 15 and the head 12 are passed through the bushing B, carried by hub H, after which the abutment member 21 is abutted against the end of the hub and engaged by the nut 23. Rotation of said nut will first move the shank 10 longitudinally so as to cause the tapered enlargement 13 to spread the fingers 17 and force them outwardly into engagement with the adjacent end of the bushing. Continued rotation of the nut 23 in the same direction will cause the shoulder 19 to exert a pulling force against the member 15, and thereby through engagement of the shoulders 18 with the bushing, draw said bushing out of its seat.

The form of the invention illustrated in Figure 3, is the same as that illustrated in Figures 1 and 2, except that the length of the shank is reduced and an abutment member 25 of cylindrical form is substituted for the abutment member 21. This form is designed for operation upon special types of bushings.

The advantages of the invention will be readily apparent to those skilled in the art to which it belongs. It will be particularly observed that the bushing engaging members may be very readily inserted into operative position in engagement with the bushing to be removed and that by reason of the expanded positions of said bushing engaging members it is practically impossible for them to slip out of engagement with the bushing. The jacking arrangement provided by the abutment member and the cooperation therewith of the threaded shank and nut insures the obtaining of the maximum efficiency of the pull exerted upon the shank during the withdrawal of the bushing.

It is to be understood that the dimensions indicated in the drawing have been selected for illustrative purposes only, and that said dimensions may be varied at will, to suit different conditions and to accommodate different sizes of bushings, without departing from the spirit of the invention.

Having thus explained the nature of the invention and described an operative manner of constructing and using the same, although without attempting to set forth all of the forms in which it may be made, or all of the forms of its use, what is claimed is:—

1. A tool of the character described comprising a threaded shank provided with a head at one end, said head having one end provided with a tapered enlargement and the other end provided with a shoulder, a bushing engaging member slidably mounted on said shank and having bushing engaging fingers enclosing said head, an abutment member slidably mounted on said shank, a nut working on said shank and engaging said abutment member so that longitudinal movement may be imparted to the shank, the inner surfaces of said fingers being tapered to engage the tapered surface of said enlargement.

2. A tool of the character described comprising a shank provided with a head at one end having an annular shoulder, a bushing-engaging-member slidably mounted on said shank and having bushing-engagement-fingers positioned to enclose said head, said shoulder being positioned to limit relative movement of the shank and bushing-engaging-member in one direction, said head being shaped to expand said fingers, an abutment member movably mounted on said shank, and means also mounted on said shank and engaging said abutment member so as to impart movement to the shank with respect to said abutment member.

3. A tool of the character described comprising a threaded shank having a head at one end, said head having an annular shoulder and a tapered enlargement, a bushing-engaging-member slidably mounted on said shank and having resilient-bushing-engaging fingers, movement of said bushing along said shank in one direction being limited by said shoulder, an abutment member adjustably mounted on said shank, and means also mounted on said shank and engaging said abutment member so as to impart longitudinal movement of the shank with respect to said abutment member to bring said enlargement into engagement with the inner portions of the resilient fingers, said inner portions being tapered so as to engage the tapered enlargement of said head.

4. A tool of the character described comprising a threaded shank provided with a head at one end, said head being tapered and having an annular shoulder, a bushing-engaging-member slidably engaging said shank and having bushing-engaging-members positioned to enclose said head so as to be expanded thereby, a nut working on said shank and positioned to limit movement of said bushing-engaging-member in the other direction, an abutment member mounted on the shank, and a nut working on the threaded portion of said shank and engaging said abutment member so as to impart longitudinal movement to the shank.

In testimony whereof we have hereunto set our hands.

MITCHELL NAGGY.
STANLEY SIKORSKI.